Patented Oct. 3, 1922.

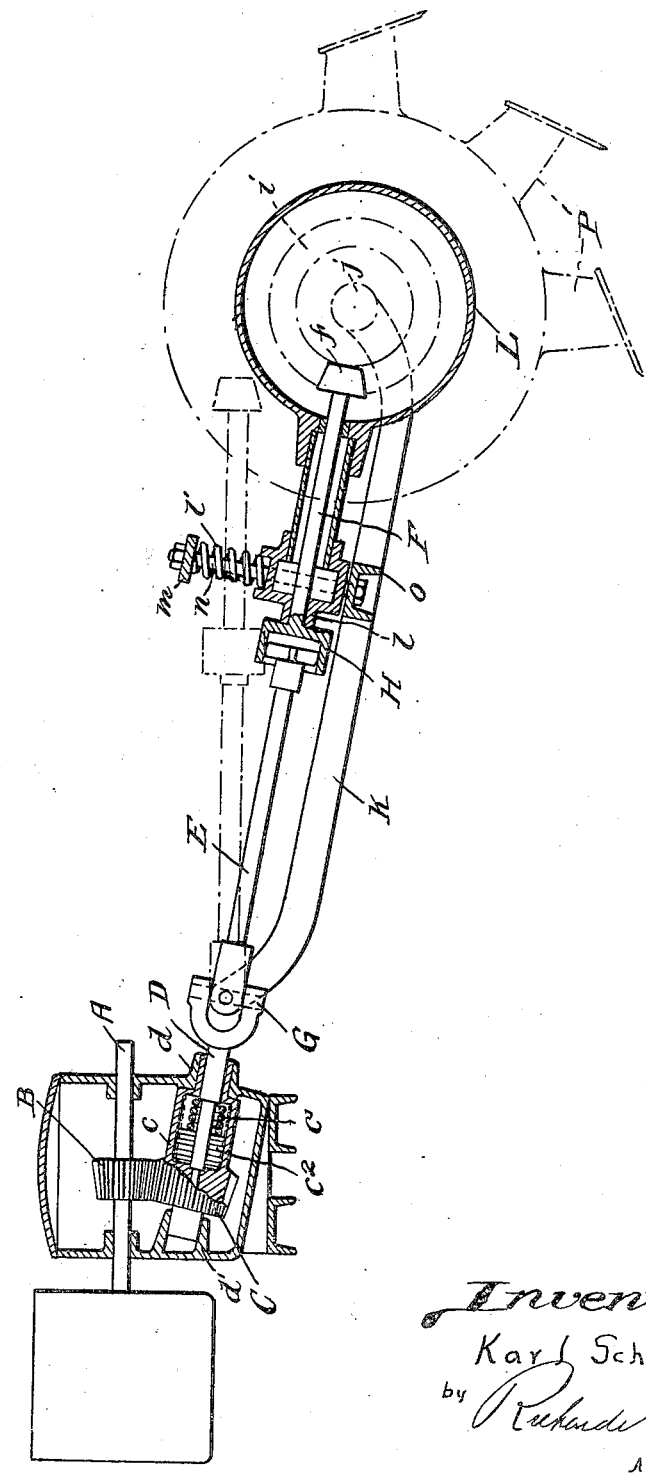

1,430,595

UNITED STATES PATENT OFFICE.

KARL SCHROEDER, OF DUSSELDORF, GERMANY, ASSIGNOR TO THE FIRM HEINRICH LANZ, OF MANNHEIM, GERMANY.

ROTARY CULTIVATOR.

Application filed March 30, 1921. Serial No. 456,966.

*To all whom it may concern:*

Be it known that I, KARL SCHROEDER, a citizen of the Republic of Germany, residing at Dusseldorf, have invented certain new and useful Improvements in Rotary Cultivators (for which I have filed applications in Germany July 3, 1914, Patent Number 294,166, and in Sweden May 5, 1920), of which the following is a specification.

This invention relates to cultivators wherein a motor shaft is coupled by toothed gears with a shaft transmitting rotation to a rotary implement carrier, the driven shafting having a pivotal joint therein for purposes of flexion.

According to my invention one portion of the driven shafting is permanently set in relation to the motor shaft at an acute angle whereby it is in axial alinement with the other part when the implement shaft or axle is in its normal working position for a given depth of tilling. Another feature of the invention consists in providing an additional joint of the Cardan or socket type in the driven shafting, and another feature consists in spring device whereby a pinion driving a toothed wheel connected to the implement axle is enabled to roll on that wheel when the implement strikes an immovable obstruction.

An embodiment of the invention is shown in the accompanying drawing, in longitudinal vertical section.

In the drawing A designates the motor shaft, and B a gear wheel fixed thereto, meshing with a gear wheel C loose on a shaft D, the shaft D being in alinement with two shafts E and F. The shaft D is connected to the shaft E by a universal joint G, and the shaft E is connected to the shaft F by a sleeve or socket joint H allowing slight axial movement. The shaft D is mounted in bearings $d$ $d^1$, at an acute angle to the shaft A, corresponding to a normal depth of tilling of, say, 8 inches. A clutch box $c$ integral with the gear wheel C encloses a spring $c^1$ and a friction clutch $c^2$, whereby the wheel is coupled with the shaft.

A bevel pinion $f$ fixed to the shaft F meshes with a bevel wheel $i$ fixed to the shaft J of the wheel carrying the hoes P: this shaft is mounted in beam K. The toothed wheel $i$ is enclosed in a box L, in which the shaft J is rotatable, and to which is joined a bearing $l$ for the shaft F. Springs $l^1$ are interposed between the bearing $l$ and a yoke $m$, the latter being connected to a transverse support $o$ by rods $n$, one at each side of the shaft. These springs $l^1$ tend to hold the bearing $l$ and shaft F in axial alinement with the shaft E. If, however, the hoes P strike a firmly seated obstacle, such as a heavy stone, so that the wheel $i$ cannot rotate, the pinion $f$ rolls upon the wheel $i$ and the shaft F lifts the bearing $l$, compressing the springs $l^1$. Fracture of the gear is thus prevented, and the springs absorb and store power. The elevated position of the shaft is shown in broken lines.

The motor is also used for driving the ground wheels, by means of gearing not shown.

By a simple device the bearings $d$, $d^1$ can be made adjustable, so that the angle of the shaft D to the shaft A can be altered, to change the depth of tilling within limits, say from 8 inches to 10 or 11 inches.

What I claim as my invention and desire to secure by Letters Patent of the United States is:—

1. In a cultivator, the combination of a rotary digging implement, a motor shaft, a driven shaft, set at an acute angle to said motor shaft, gears connecting said motor shaft to said driven shaft, a two part connecting shaft, means connecting said connecting shaft to said rotary implement and a sliding coupling between the parts of said connecting shaft adapted to permit relative axial movement thereof, said driven shaft being in axial alinement with said connecting shaft when the digging implement is in normal working position.

2. In a cultivator, the combination of a rotary digging implement, a motor shaft, a driven shaft set at an acute angle to said motor shaft, gears connecting said motor shaft to said driven shaft, a connecting shaft comprising two lengths of axially alined shafting, an universal joint connecting said driven and connecting shafts, a sliding coupling between the lengths of said connecting shaft adapted to permit relative axial movement thereof, and means connecting said connecting shaft to said rotary implement, said driven shaft being in axial alignment with said connecting shaft when the digging implement is in normal working position.

3. In a cultivator the combination of a rotary digging implement, a motor shaft, a driven shaft, set at an acute angle to said motor shaft, gears connecting said motor shaft to said driven shaft, a connecting shaft, a flexible coupling between said motor shaft and said connecting shaft, a bevel wheel fixed to said digging implement, a pinion fixed to said connecting shaft and engaged with said bevel wheel, and a spring device which normally holds said connecting shaft in axial alinement with said driven shaft for driving the bevel wheel, but which allows said pinion to roll on said bevel wheel when the latter is restrained from rotation.

4. In a cultivator the combination of a rotary digging implement, driving shaft, a driven shaft set at an acute angle to said driving shaft, gears connecting said driving shaft to said driven shaft, and means connecting said driven shaft to said rotary implement, said connecting means including a flexible coupling, a shaft, toothed gears and a spring device which normally holds said toothed gears in operative engagement but allows one to roll on the other when the rotary implement is restrained for rotation.

In testimony whereof I affix my signature in presence of two witnesses.

KARL SCHROEDER.

Witnesses:
  CARL ROSIER,
  PAUL ESSER.